United States Patent [19]
Wreede

[11] Patent Number: 4,988,152
[45] Date of Patent: Jan. 29, 1991

[54] HOLOGRAPHIC REARVIEW MIRROR AND METHOD OF PRODUCING SAME

[75] Inventor: John E. Wreede, Monrovia, Calif.

[73] Assignee: Hughes Aircraft Company, Los Angeles, Calif.

[21] Appl. No.: 797

[22] Filed: Jan. 6, 1987

[51] Int. Cl.$^5$ .......................... G02B 5/32; G02B 27/14
[52] U.S. Cl. ...................................... 350/3.7; 350/174
[58] Field of Search ................. 350/3.7, 3.61, 174

[56] References Cited

U.S. PATENT DOCUMENTS

| | | | |
|---|---|---|---|
| 4,258,111 | 3/1981 | Matsumoto et al. | 350/3.61 |
| 4,412,719 | 11/1983 | Feinup | 350/3.7 |
| 4,499,451 | 2/1985 | Suzuki et al. | 340/98 |
| 4,560,233 | 12/1985 | Banbury | 350/174 |
| 4,613,200 | 9/1986 | Hartman | 350/174 |
| 4,647,142 | 3/1987 | Boot | 350/174 |
| 4,790,613 | 12/1988 | Moss | 350/3.7 |

OTHER PUBLICATIONS

Jannson et al., "Solar Control Tunable Lippman Holowindows", Solar Energy Materials 14 (1986), 289–297.
Sjölinder, Suen "Bandwidth in Dichromated Gelatin Holographic Filters", Optica Acta, 1984, vol. 31, No. 9, pp. 1001–1012.
Magarinos, Jose R., "Infinity Display in Color with Large Aperture Holographic Optics", proceedings of ICO-II Conference, Madrid, Spain (1978, 10–17 Sep.), pp. 415–418.
Rao, S. Ananda et al., "Holographic Methods for the Fabrication of Various Types of Mirrors", Rev. Sci. Instrum-51 (6), Jun. 1960, pp. 809–813.
Holographic Optical Elements Using Polyvinyl Carbazole Holographic Material by K. Matsumoto, T. Kuwayama, M. Matsumoto and N. Taniguchi; SPIE vol. 600, Progress in Holographic Applications (1985), pp. 9–13.
Holographic recording material containing poly-N-vinylcarbazole by Yasuo Yamagishi, Takeshi Ishizuka, Teruo Yagishita, Kasumi Ikegami and Hirofumi Okuyama; SPIE, vol. 600, Progress in Holographic Applications (1985), pp. 14–19.

Primary Examiner—Bruce Y. Arnold
Assistant Examiner—Terry S. Callaghan
Attorney, Agent, or Firm—Leonard A. Alkov; Wanda K. Denson-Low

[57] ABSTRACT

An improved rearview mirror and process for producing the same is provided wherein an elongated substrate member is configured for attachment to the interior of a windshield. The substrate member supports an image retaining coating defining a holographic reflective surface that is configured to be substantially normal to the line of sight of the driver despite the slope of the windshield. As a result, a thin distortion free mirror can be provided with an expanded line of sight for the driver.

15 Claims, 2 Drawing Sheets

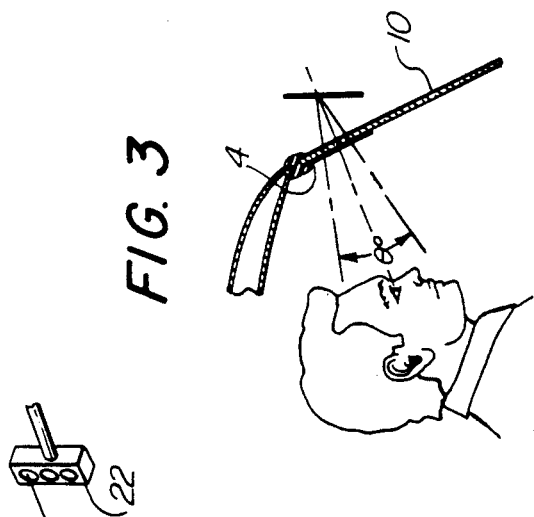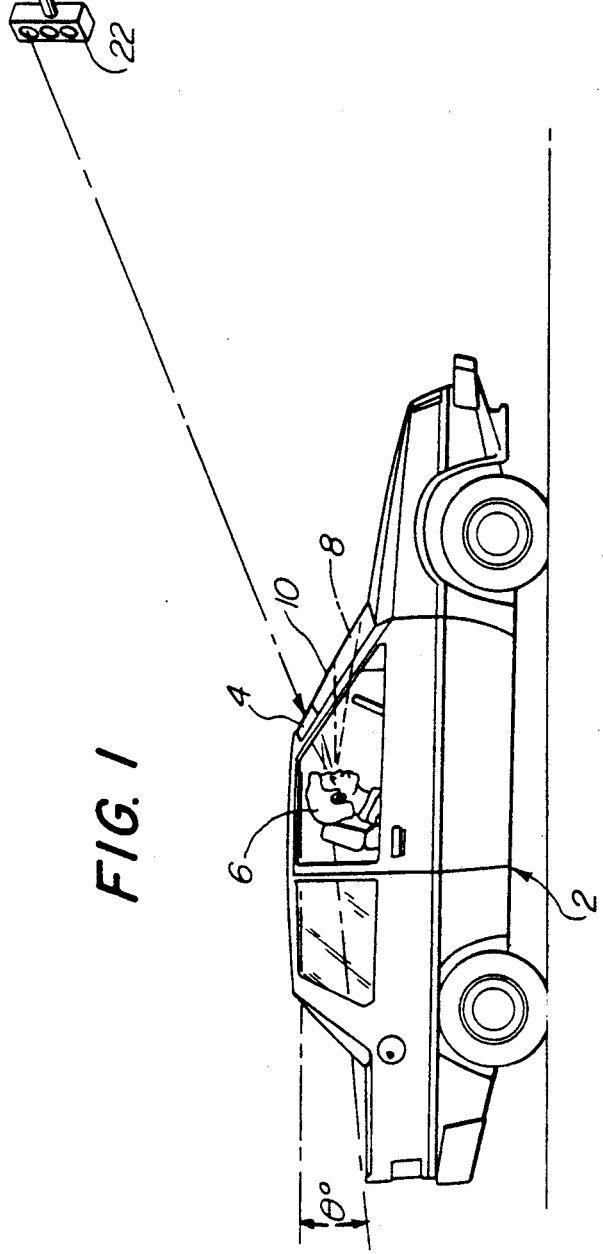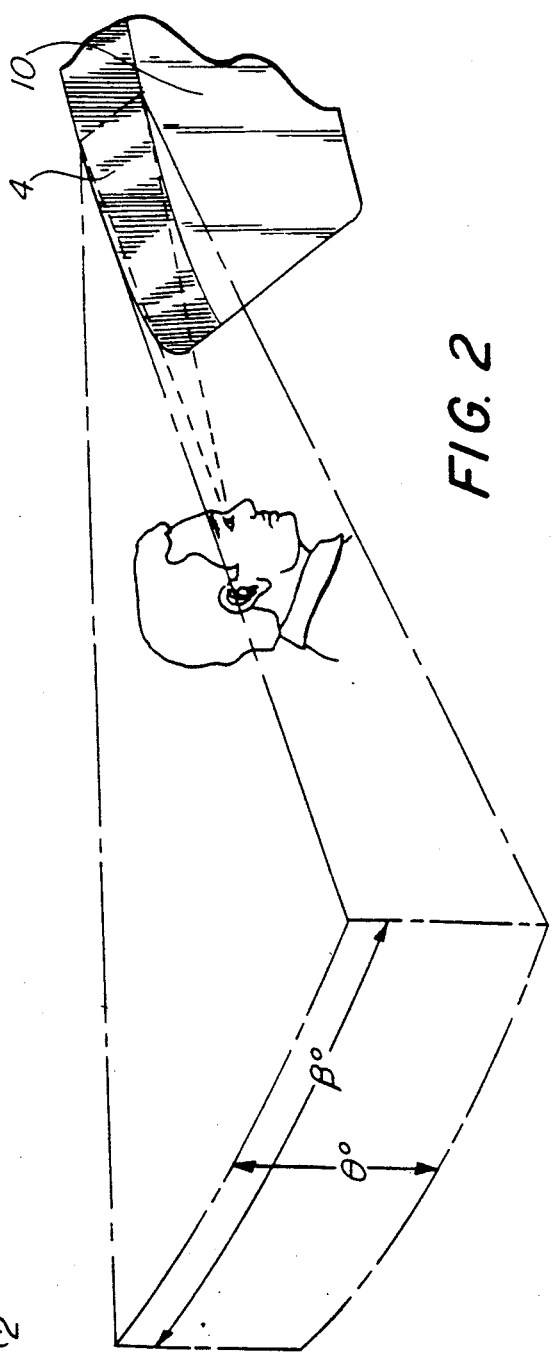

HOLOGRAPHIC REARVIEW MIRROR AND METHOD OF PRODUCING SAME

BACKGROUND OF THE INVENTION

1. Field of the Invention

The present invention is directed to a reflective mirror for permitting a driver to view images from the rear of the vehicle and more particularly, it is directed to a holographic reflective mirror which can be positioned directly on the curved windshield and compensated for any slant or curve of the windshield surface relative to the line of sight of the driver.

2. Description of the Prior Art

Numerous suggestions have been made in the prior art to provide an improved rearview mirror for use on a vehicle which increases the line of sight of the observer without distorting the relative position and size of the viewed objects. Conventional rearview mirrors utilized on vehicles have generally been planar mirrors formed of a glass substrate having a reflective coating positioned on the rear surface of the glass and coated further with a protective material to prevent oxidation of the reflecting film. Such mirrors have generally been of a flat two dimensional configuration that were elongated to extend traversely across a portion of the driver's forward line of sight. Frequently, such mirrors were cantilevered from the roof of the vehicle or cantilevered directly from the interior of the windshield. The attempts to remove any blind spots from the rear view of the driver is well documented in the prior art. Suggestions have been made to utilize convex mirrors to extend the viewing angle, however, distortion generally occurs and the objects viewed through such a convex mirror appear farther away than they actually are due to the magnification of the images. Extended, elongated mirrors with a series of stepped planar reflective surfaces have also been attempted to extend the view of the driver. These mirrors, however, are bulky and provide fragmented viewing angles to the driver.

Attempts have also been made to adhere to the surface of the rear window various refractive elements to extend the line of sight or view of the driver. Again, distortion frequently occurs and an unrealistic image is frequently conveyed to the driver.

There is still a demand in the prior art to provide a reflective rearview mirror which extends the viewing angle of the driver while portraying the images in proper perspective and position to enable the driver to make the necessary decisions for the safe operation of the vehicle.

SUMMARY OF THE INVENTION

The present invention provides an improved rearview mirror for a vehicle which can be economically manufactured while providing an increased viewing angle of realistic images to the driver. The rearview mirror, in a preferred embodiment, includes an elongated flexible substrate member capable of being laminated to the interior surface of the windshield and having a holographic image retaining coating deposited on the substrate. The coating is exposed to define a holographic reflective image for substantially a major spectrum of visible light striking the surface for reflection to the viewing angle of the driver. The holographic reflective image provides an optical element that defines basically a planar reflective surface that extends transverse to the line of sight of the driver despite the curve and slant of the windshield to insure a distortion free, wide viewing angle to the driver to cover the entire portion of the rear of the vehicle that can be observed. The holographic rearview member can be laminated to the windshield and can extend substantially across the upper interior surface of the windshield, such as, for example, the first four inches across the upper surface of the windshield. The holographic optical reflective image can be further developed to provide a solar shield or exterior light reflecting surface for the driver to thereby provide a dual function in actual operation.

The holographic rearview mirror of the present invention can be formed by a process of supplying a continuous strip or web of a flexible holographic film coated substrate that can be transported past an exposure station. The holographic reflected image is defined by diffraction parallel fringes, and the web can be continuously transported across a highly reflected surface, such as a highly reflective mirror. A laser source can scan traverse to the axis of movement of the web to expose the film coated substrate as it passes over the mirror surface and thereby record the reflected surface as an image in the coating. Alternatively, a step exposure process can be utilized when a more complex holographic reflective image is desired, such as to compensate for the slant and curve of modern windshields. A roll of an elongated flexible substrate member having a holographic image retaining coating deposited on that substrate can be advanced to extend across a hologram master having the desired reflective capabilities. A light source can then translate across the entire length of the master hologram to develop the photosensitive coating over the master hologram. Another predetermined length of the elongated substrate material can be advanced to the exposure station and the step can be repeated to provide a continuous step exposure process using a master hologram.

The many intended advantages of the present invention may be best understood by reference to the accompanying drawings in which like reference symbols designate like parts throughout the figures thereof.

BRIEF DESCRIPTION OF THE DRAWINGS

FIG. 1 represents a schematic of a vehicle employing the holographic rearview mirror of the present invention;

FIG. 2 represents a schematic disclosing the relationship of the viewing angle of the driver;

FIG. 3 is a schematic view showing the virtual image of the reflective surface realized by the hologram at a preferred position normal to the line of sight of the driver;

DESCRIPTION OF THE PREFERRED EMBODIMENTS

The following description is provided to enable any person skilled in the field of optics to make and use the invention and sets forth the best modes contemplated by the inventor for carrying out his invention. Various modifications, however, will remain readily apparent to those skilled in the art, since the generic principles of the present invention have been defined herein specifically to provide a relative simplified and easily manufactured optical reflective hologram mirror for use in a vehicle.

Referring to FIG. 1, a vehicle 2 is schematically illustrated to define the relative position of the rearview mirror 4 of the present invention to that of the line of sight of a driver 6.

Figure 4:
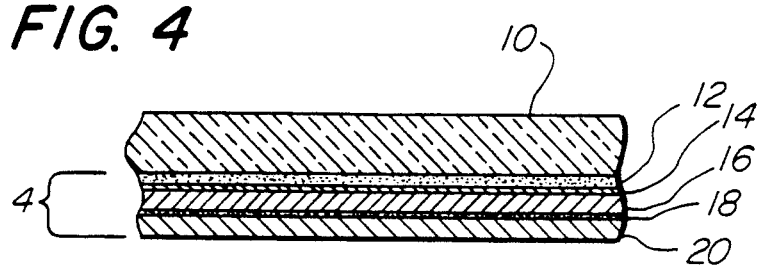
FIG. 4 discloses a cross sectional view of the windshield and laminated rearview holographic mirror of the present invention.

Generally, the driver's line of view is directed forward as can be seen from the ray traces 8 to observe oncoming traffic. The rearview mirror of the present invention can be laminated onto the windshield 10 by an adhesive 12, such as an optical element, as can be seen in the cross sectional view of FIG. 4. Preferably, the rearview mirror is positioned entirely across the upper portion of the windshield 10, such as the first four inches to permit a dual effect of serving as a partial sunshield besides providing the virtual image of a reflective surface to the driver 6. A transparent substrate 14 can be adhered to the interior surface of the windshield 10 by an optical cement, such as an epoxy sold as Epotek 302-3 made by Epoxy Technology Corp., Massachusetts. A dichromated gelatin or a poly-N-vinyl carbazole coating 16 can be deposited upon the substrate 14 and can be suitably exposed to carry an image retaining hologram of the desired reflective surface. Another layer of optical cement 18 can adhere a transparent protective coating 20 that will preferably prevent moisture and be resistant to abrasion to thereby protect the desired hologram reflective image in layer 16. Alternatively, an anti-abrasive film coating can be deposited, such as silicon dioxide.

The specific holographic materials are known in the prior art and can be found in reference material, such as "Topics in Applied Physics", Vol. 20, Holographic Recording Materials by H. M. Smith, Springer Verlag, Berlin, Germany 1977. Additionally, background on holographic procedures can be found in "Optical Holography" by Collier et al., Academic Press, New York, N.Y. (1971).

The line of sight of the driver towards the rear of the vehicle will be limited by the location of his position adjacent the steering wheel and by the physical limitations of the vehicle, such as the opening for the rearview window. Thus, a vertical line of sight $\theta$ is disclosed for the vertical field of view while a horizontal field of view is defined as $\beta$, as seen in FIG. 2. $\beta$ is generally defined by the horizontal support posts on the left and right of the vehicle rear window. As can be readily appreciated, it is advantageous in providing this extended viewing angle to eliminate any distortions that could result from the slope of the windshield to accomodate the aerodynamic configuration of modern vehicles and also the lateral curve of the windshield as utilized on most vehicles. A hologram reflective image is uniquely suitable for this purpose, since it can provide a virtual image of a planar reflection surface to the driver, as seen in FIG. 3, that will eliminate any distortion. Thus, the process of exposing and developing the hologram reflective image can take into account the actual physical location of the laminate rearview mirror 4 on the curved and slanted windshield 10 relative to the driver. Additionally, a range of viewing angles can be anticipated to cover most of the eye positions for the normal variance in driver sizes, whereby an optimum normal reflective image can be provided across the line of sight of the driver as seen in FIG. 3.

In operation, the holographic rearview mirror 4 of the present invention can be a very wide angle mirror to cover the entire rear of the car and may even negate the need for outside mirrors on the car. It can be partially transparent so that it will not block the driver's view of extraneous objects, such as traffic lights 22, while still providing a dual function of solar reflection to block a portion of bright sun light. As can be readily appreciated, it is within the skill of the holographic art to specifically design and to determine the exact amount of light which is desired to be reflected. The holographic reflective image will be preferably broadband and probably multiband so that most wavelengths of light are reflected from the viewing angle of the rear of the vehicle to that of the driver. For example, the rearview mirror will be capable of reflecting red and most of the other visible spectrum. Preferably, two holographic images can be developed on the same film with peaks about 650 and 500 nanometers with a maximum reflectivity on the order of 90%. The bandwidth of each of the peaks will be approximately 50 nanometers.

By covering approximately the top four inches of the windshield, it should be possible to provide the desired holographic rearview mirror without any adjustment for driver height or seat position. A distinct advantage of the present invention is that it can provide a plane of reflection, through a virtual image, that will be normal to a line intersecting the driver's eyesight and this plane of reflection need not coincide with the actual windshield shape or location. As can be seen in FIG. 3, the virtual image can even be realized at a position offset from the actual window to accomodate an optimum positioning of the reflective surface.

Figure 5:
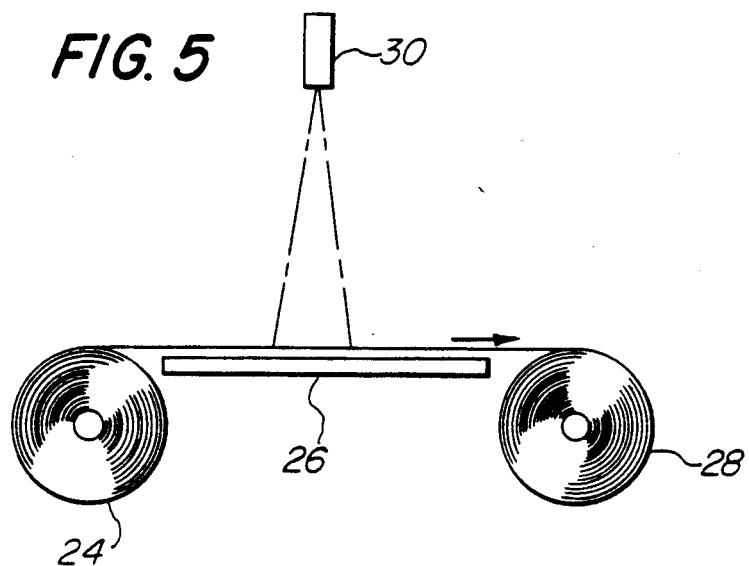
FIG. 5 discloses a schematic view of apparatus for performing the continuous method of exposing a rearview mirror laminate.

Referring to FIG. 5, an apparatus and a method of manufacturing a continuous rearview mirror web or strip is schematically shown. A supply roller 24 can be motor driven (not shown) to drive a substrate member configured for attachment to the interior of a windshield by an appropriate adhesive, such as an optical cement 12, on one surface and carrying an image retaining coating 16 on the other surface across a desired mirror or highly reflective surface 26. A take-up roller 28 can store the developed image to permit the desired length of flexible laminated rearview mirrors to be cut from the storage roller and applied to individual windshields during a production line process. A laser 28 can scan traverse to the direction of movement of the web or strip material to provide an exposure source. In this continuous production method shown in FIG. 5, the holographic rearview mirror 4 is of a simple parallel fringe reflection hologram. The light sensitive film can be coated on the plastic film base. For example, if a Polaroid Corporation film DMP-128 were used, it can be purchased precoated. With a light sensitive film held close to the mirror surface 26 a large degree of manufacturing tolerance is permitted and the exposure can be by a continuous scanning with the film strip motion providing the one axis of a raster scan.

Figure 6:
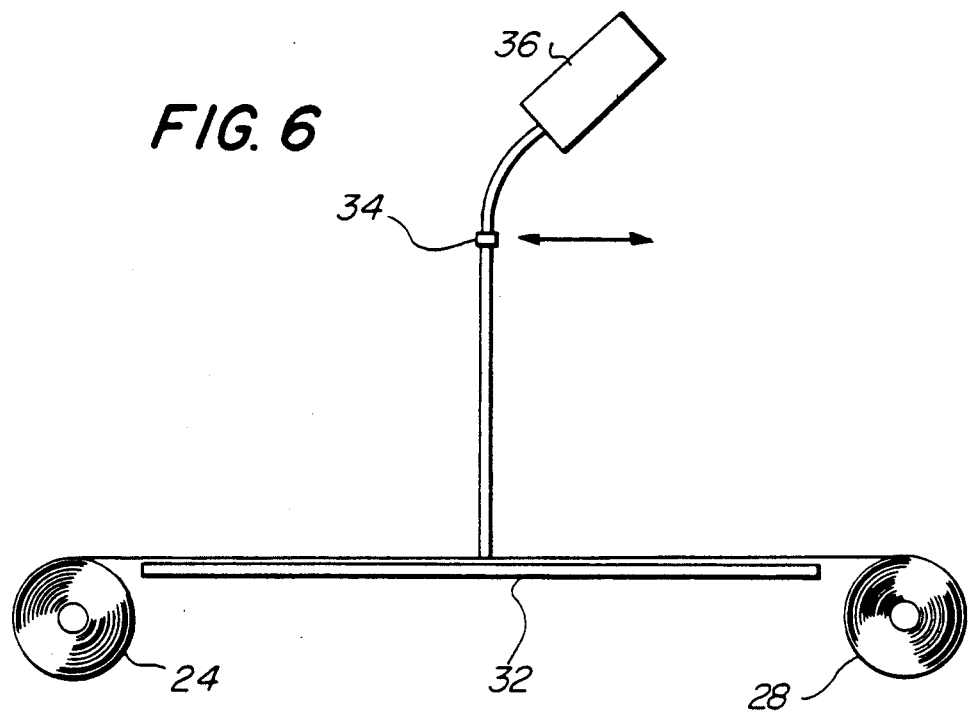
FIG. 6 represents a schematic of the apparatus for a step exposure process of a rearview mirror.

FIG. 6 discloses an alternative production apparatus and process wherein a more complex hologram can be provided, such as having fringes to compensate for the lateral curvature of the windshield. In this process, the previous mirror or reflective surface is replaced by a master hologram 32 of the appropriate shape. The exposure source could be carried on a carriage (not shown) to provide a thin line exposure to scan the entire length of a portion of the film that has been prepositioned across the master hologram. A cylindrical lens 34 can direct a single mode fiberoptic source 36 to create a thin line of exposing beam for the translation across the master hologram. As can be appreciated, the laser beam could be collimated in both axes with rather simple optics.

The preferred image retaining coating is a poly-N-vinyl carbazole but even a dichromated gelatin could be utilized in the continuous process. If the gelatin is utilized, it is preferable that it be attached to the glass windshield so that a direct contact with water could be avoided. As can be appreciated, the preferred embodiment could provide a hologram with tilted or non-parallel fringes which could be made on the continuous process of FIG. 5 if the only changes are to compensate for the slope. If more complex changes are necessary, the master hologram of FIG. 6, at the proper angle, would be utilized.

If the desired rearview mirror is to have two or more wavelength peaks, it is possible to accomplish production of this laminate rearview mirror with two or more stage exposures, such as shown in FIG. 5 or FIG. 6, with a second or third exposure station having a laser input at different angles and to provide non-parallel fringes.

It is also possible to have a guard hologram image or reflective hologram for controlling the ambient exterior light integrated with the hologram rearview mirror of the present invention. This can be accomplished with either a single or multiple layers of holographic material.

As can be readily appreciated, it is possible to deviate from the above embodiment of the present invention, and as will be readily understood by those skilled in the art, the invention is capable of many modifications and improvements within the scope and spirit thereof. Accordingly, it will be understood that the invention is not limited by the specific disclosed embodiments but only by the scope and spirit of the appended claims.

What is claimed is:

1. A combination vehicle windshield and rearview mirror comprising:
    a curved transparent substrate adapted for mounting on a portion of the vehicle windshield while permitting observation of the forward motion of the vehicle;
    a thin film holographic optical reflective element laminated onto the substrate to provide a reflection of light coming from the rear of the vehicle to the driver, the optical element further limiting transmission of only some of the light coming from the front of the vehicle to the driver; and
    a pair of reflective holograms developed on the coating at wavelength bands having different maximum wavelength peaks.

2. The invention of claim 1 further comprising parallel fringe provided by the coating.

3. The invention of claim 1 further comprising non-parallel fringe to compensate for the curvature of the rearview windshield.

4. The invention of Claim 1 further comprising a parallel tilted fringe reflection image provided by the coating, the tilt being set at exposure of an image to compensate for the slope of the windshield in the plane extending along the line of sight of a driver to prevent distortion.

5. The invention of claim 1 wherein the substrate is an elongated flexible transparent member.

6. The invention of claim 1 further including an adhesive coating on the substrate for attachment to the interior windshield surface.

7. A combination vehicle windshield and rearview mirror comprising:
    a curved transparent substrate adapted for mounting on a portion of the vehicle windshield while permitting observation of the forward motion of the vehicle;
    a thin film holographic optical reflection element laminated onto the substrate to provide a reflection of light coming from the rear of the vehicle to the driver, the optical element further limiting transmission of only some of the light coming from the front of the vehicle to the driver wherein the image coating is poly-N-vinyl carbazole.

8. The invention of claim 7 further comprising parallel fringes provided by the coating.

9. The invention of claim 7 further comprising non-parallel fringes to compensate for the curvature of the rearview windshield.

10. The invention of claim 7 further comprising parallel tilted fringes provided by the coating, the tilt being set at exposure of an image to compensate for the slope of the windshield in the plane extending along the line of sight of a driver to prevent distortion.

11. The invention of claim 7 further including a pair of reflective holographic images developed on the coating at wavelength bands having different maximum wavelength peaks.

12. The invention of claim 11 wherein the maximum peaks are at 650 nanometers and 500 nanometers.

13. The invention of claim 7 wherein the substrate is an elongated flexible transparent member.

14. The invention of claim 7 further including an adhesive coating on the substrate for attachment to the interior windshield surface.

15. A combination vehicle windshield and rearview mirror comprising:
    a curved transparent substrate adapted for mounting on a portion of the vehicle windshield while permitting observation of the forward motion of the vehicle;
    a thin film holographic optical reflective element laminated onto the substrate to provide a reflection of light coming from the rear of the vehicle to the driver, the optical element further limiting transmission of only some of the light coming from the front of the vehicle to the driver; and
    a pair of reflective holographic images developed on the coating at wavelength bands having different maximum wavelength peaks, wherein the maximum peaks are at 650 nanometers and 500 nanometers.

* * * * *